(No Model.)
T. D. IRWIN.
STRAINER.
No. 587,438. Patented Aug. 3, 1897.
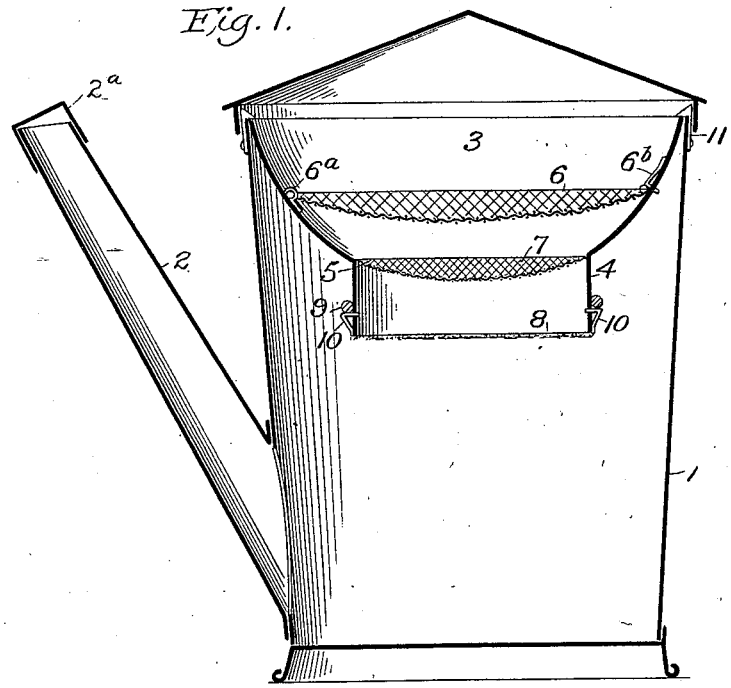
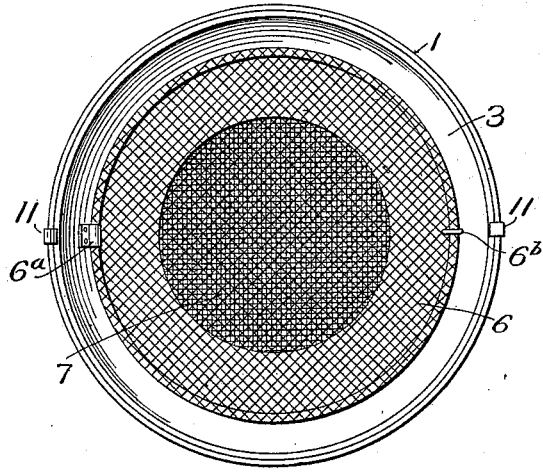
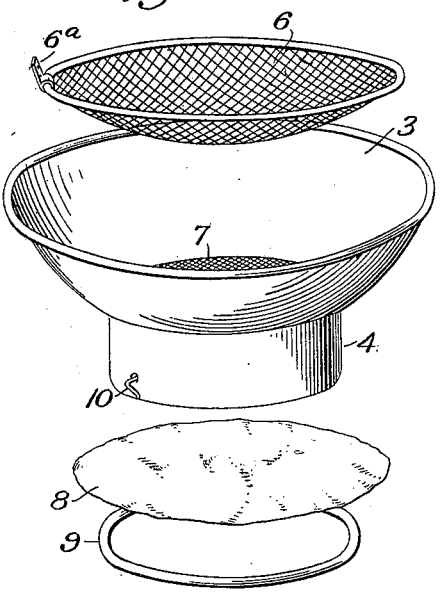
WITNESSES
James F. Duhamel
A.M. Poynton
INVENTOR,
THOMAS D. IRWIN,
By John Wedderburn
Attorney

UNITED STATES PATENT OFFICE.

THOMAS D. IRWIN, OF OIL CITY, PENNSYLVANIA.

STRAINER.

SPECIFICATION forming part of Letters Patent No. 587,438, dated August 3, 1897.

Application filed March 31, 1897. Serial No. 630,091. (No model.)

*To all whom it may concern:*

Be it known that I, THOMAS D. IRWIN, a citizen of the United States, residing at Oil City, in the county of Venango and State of Pennsylvania, have invented certain new and useful Improvements in Strainers; and I do hereby declare the following to be a full, clear, and exact description of the invention, such as will enable others skilled in the art to which it appertains to make and use the same.

This invention relates to certain improvements in strainers which are primarily intended for use in connection with milk-pails, but they may be used to equal advantage for the purposes of straining other liquids, the object being to provide a strainer of this character which is detachably connected to the pail or vessel and which can be readily removed for the purpose of cleaning.

The invention comprises certain novel features of construction and arrangements of parts whereby the above and other important advantages are attained, as will be hereinafter fully described, and specifically defined in the appended claims.

In the accompanying drawings, Figure 1 represents a vertical section of a milk-pail having my invention applied thereto. Fig. 2 is a top plan view of the same. Fig. 3 is a detail perspective view of my improved strainer removed from the can and showing the parts separated.

Similar reference-numerals indicate corresponding parts in all the figures of the drawings.

1 designates the pail, which may be of any ordinary or desired construction and shown in this instance as provided with a spout 2, through which the liquid may pass from the can 1. A cover $2^a$ is pivotally arranged at the mouth of the spout to prevent the milk from spilling and to exclude the dust therefrom.

My improved strainer comprises a semispherical chamber 3, having a downwardly-projecting flange 4, which extends around an opening 5 in the lower end of the chamber, through which the milk is permitted to pass into the pail 1.

I arrange within the chamber 3 a plurality of strainers 6, 7, and 8, the former being made, preferably, of medium wire mesh or strainer-cloth and is hinged therein at $6^a$, a retaining-clasp $6^b$ being provided directly opposite the hinge to secure the said strainer in place.

As will be noticed by reference to Fig. 1, the strainer 6 is dished or made concave, and the outer edge is adapted to snugly fit the interior of the chamber, so that as the milk is poured therein its tendency will be to fall toward the center.

The strainer 7 is located immediately below the one just described and follows, substantially, the contour of the chamber 3, being permanently secured thereto and made of fine wire mesh.

The strainer 8 is preferably made of linen cloth or analogous material having the proper straining qualities and is connected to the flanged opening of the chamber 3 by means of a hoop 9, which passes over the end thereof, and between which the linen or other straining material is placed. As this hoop is pressed over the flange the strainer is drawn tightly over the lower edge of the opening, and the catches 10, which are secured to the flange, engage with the lower end of the hoop and thus secure it in place, the catches offering substantial resistance to its removal by the weight of the liquid as it passes through.

As will be evident from the foregoing, the strainer 6 may be raised for purposes of cleaning by releasing the catch $6^b$, and the strainer 8 can be readily removed for the same purpose by releasing the catches 10. This will give free access to the intermediate strainer 7, which may thereupon be readily cleaned.

It will of course be understood that when my invention is applied to a milk-pail suitable provision will be made for a cover, and this provision may consist in extending the upper edge of the chamber beyond the edge of the pail and providing the former with a laterally-projecting flange to rest upon the edge of the pail. Snap-hooks 11 in this case will be arranged upon the pail, so as to engage the flange and thus prevent the removal thereof through upsetting or from other cause.

The arrangement of the strainers above described causes a thorough straining of the milk or other liquid, it being obvious that as the liquid passes down the small sediments or other impurities will be checked and caused to lodge upon the strainers. It will also be observed that as the milk is so checked in its downward passage through the strainers its tendency to foam or agitate is materially lessened.

The pail may also be used with the strainers in place thereon during the initial operation of milking the cow, in which event it will be obvious that the milking and straining will be accomplished at the same time, which may be found desirable under certain conditions.

It will thus be seen that my invention provides in a simple and inexpensive manner a strainer which can be readily attached to and removed from milk-pails, crocks, and other vessels, and that by its use a thorough and rapid straining is given to the liquid; and it is obvious that my invention is susceptible of many modifications without departing from the essential features thereof, and I do not wish to be understood as limiting myself to the precise details of construction herein shown and described, reserving the right to make such changes and alterations therein as will fairly fall within its spirit and scope.

Having thus described my invention, what I claim as new, and desire to secure by Letters Patent, is—

1. The herein-described strainer for the purpose specified, comprising a semispherical body portion having a central opening, and an annular flange depending therefrom and surrounding said opening, a screen pivotally arranged in the spherical portion of the strainer, a removable screen applied around the depending flange, a removable hoop surrounding said flange for holding the removable screen in place thereon, spring-catches mounted on said flange for engaging and retaining said hoop in place, and an intermediate screen permanently arranged at the intersection of the spherical and annular portions of the screen, substantially as described.

2. A strainer for the purpose specified, comprising a semispherical body having a central opening, a depending flange surrounding said opening, spring-catches arranged at diametrically opposite points on and projecting outwardly from said flange, a removable cloth or screen of flexible material, and a removable hoop surrounding said flange and engaged by said catches for holding the removable screen in place, substantially as described.

In testimony whereof I have signed this specification in the presence of two subscribing witnesses.

THOMAS D. IRWIN.

Witnesses:
WILLIAM E. STEVENSON,
ROY HARVEY.